United States Patent
Guralnik et al.

(10) Patent No.: US 7,337,086 B2
(45) Date of Patent: Feb. 26, 2008

(54) SYSTEM AND METHOD FOR COMBINING DIAGNOSTIC EVIDENCES FOR TURBINE ENGINE FAULT DETECTION

(75) Inventors: Valerie Guralnik, Orono, MN (US); Dinkar Mylaraswamy, Fridley, MN (US); Harold C. Voges, Shoreview, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/583,248

(22) Filed: Oct. 18, 2006

(65) Prior Publication Data

US 2007/0088982 A1   Apr. 19, 2007

Related U.S. Application Data

(60) Provisional application No. 60/728,088, filed on Oct. 18, 2005.

(51) Int. Cl.
*G01M 15/00* (2006.01)
(52) U.S. Cl. .................... 702/113; 702/183
(58) Field of Classification Search ............. 702/113, 702/188
See application file for complete search history.

(56) References Cited

U.S. PATENT DOCUMENTS

| | | | |
|---|---|---|---|
| 4,642,782 A | 2/1987 | Kemper et al. | |
| 4,649,515 A | 3/1987 | Thompson et al. | |
| 4,905,162 A | 2/1990 | Hartzband et al. | |
| 4,970,657 A | 11/1990 | Wolf | |
| 5,179,625 A | 1/1993 | Hisano | |
| 5,631,831 A | 5/1997 | Bird et al. | |
| 6,304,833 B1 | 10/2001 | Ferkinhoff et al. | |
| 6,408,259 B1* | 6/2002 | Goebel et al. | 702/183 |
| 6,408,290 B1 | 6/2002 | Thiesson et al. | |
| 6,415,276 B1 | 7/2002 | Heger et al. | |
| 6,456,991 B1 | 9/2002 | Srinivasa et al. | |
| 6,745,157 B1 | 6/2004 | Weiss et al. | |
| 6,768,982 B1 | 7/2004 | Collins et al. | |
| 6,782,376 B2 | 8/2004 | Sato et al. | |
| 6,807,537 B1 | 10/2004 | Thiesson et al. | |
| 6,813,615 B1 | 11/2004 | Colasanti et al. | |
| 6,895,298 B2 | 5/2005 | Page | |
| 6,944,566 B2 | 9/2005 | Chen et al. | |
| 6,950,812 B2 | 9/2005 | Suermondt et al. | |
| 6,952,688 B1 | 10/2005 | Goldman et al. | |
| 2004/0225587 A1 | 11/2004 | Messmer et al. | |
| 2005/0096873 A1* | 5/2005 | Klein | 702/184 |
| 2005/0114090 A1* | 5/2005 | Black et al. | 702/188 |
| 2005/0154509 A1 | 7/2005 | Schubert et al. | |

* cited by examiner

*Primary Examiner*—John Barlow
*Assistant Examiner*—Jonathan Moffat
(74) *Attorney, Agent, or Firm*—Ingrassia Fisher & Lorenz

(57) ABSTRACT

A system and method for combining conclusions from multiple fault detection techniques to isolate likely faults in a turbine engine is provided. The system and method provide the ability to effectively deal with multiple concurrent faults in the engine. Additionally, the embodiments of the invention provide the ability to correctly characterize multiple conclusions generated from evidence having different levels of interdependence. In one embodiment, the conclusions based on device data with high dependency are aggregated using a high dependency aggregation rule, and the resulting high-dependency sets are then further aggregated using a weak dependency rule. Finally, any conclusions based on independent evidence can be aggregated using an independent combination rule. The resulting aggregation determines which fault(s) are most likely indicated by the plurality of conclusions, taken into account the dependency of the device data used to generate the conclusions.

15 Claims, 6 Drawing Sheets

SYSTEM AND METHOD FOR COMBINING DIAGNOSTIC EVIDENCES FOR TURBINE ENGINE FAULT DETECTION

CROSS-REFERENCES TO RELATED APPLICATION

This application claims the benefit of U.S. Provisional Application No. 60/728,088 filed Oct. 18, 2005.

FIELD OF THE INVENTION

This invention generally relates to diagnostic systems, and more specifically relates to prognosis systems for mechanical systems.

BACKGROUND OF THE INVENTION

Modern mechanical systems can be exceedingly complex. The complexities of modern mechanical systems have led to increasing needs for automated prognosis and fault detection systems. These prognosis and fault detection systems are designed to monitor the mechanical system in an effort to predict the future performance of the system and detect potential faults. These systems are designed to detect these potential faults such that the potential faults can be addressed before the potential faults lead to failure in the mechanical system.

One type of mechanical system where prognosis and fault detection is of particular importance is aircraft systems. In aircraft systems, prognosis and fault detection can detect potential faults such that they can be addressed before they result in serious system failure and possible in-flight shutdowns, take-off aborts, delays or cancellations. Engines are, of course, a particularly critical part of the aircraft. As such, fault detection for aircraft engines are an important part of an aircraft's fault detection system.

In some applications it is desirable to use multiple fault detection techniques to monitor a mechanical system. In these applications the different fault detection techniques can focus on different part of the system, and can use different data and algorithms in determining if potential fault exists. One issue in utilizing multiple fault detection techniques is the ability to correctly harmonize the multiple potential conclusions derived from the concurrent use multiple different fault detection techniques. Specifically, using multiple fault detection techniques can potentially result in multiple incomplete, ambiguous or contradictory conclusions. Unfortunately, previous techniques for combining incomplete conclusions from multiple fault detection techniques have had limited ability to deal with multiple concurrent faults and dependent evidence. This has reduced the ability to utilize multiple different fault detection techniques to accurately detect potential faults.

Thus, what is needed is an improved system and method for combining conclusions from multiple fault detection techniques in mechanical systems such as turbine engines.

BRIEF SUMMARY OF THE INVENTION

The present invention provides a system and method for combining conclusions from multiple fault detection techniques to isolate likely faults in a turbine engine. The embodiments of the invention provide the ability to effectively deal with multiple concurrent faults in the engine. Additionally, the embodiments of the invention provide the ability to correctly characterize multiple conclusions generated from evidence having different levels of interdependence.

Specifically, the present invention provides a multi-technique, multi-fault detection system and method that isolates likely fault(s) in turbine engines. The system receives device data, including sensor data from the turbine engine. The device data is passed to a plurality of fault detectors. Each fault detector analyzes the device data to determine a likelihood of one or more particular faults in the turbine engine. The plurality of fault detectors can use a different fault detection technique and different types and combinations of device data to determine the likelihood of fault in the turbine engine. Additionally, the plurality of fault detectors can determine the likelihood of different types of faults in the turbine engine. Accordingly, each of the plurality of fault detectors outputs a conclusion that indicates the likelihood of a corresponding fault or faults in the turbine engine.

The conclusions from the fault detectors are passed to a diagnostic aggregation mechanism that isolates likely faults from the plurality of conclusions. In one embodiment, the diagnostic aggregation mechanism determines possible multi-fault combinations that are indicated by the conclusions. This is done by identifying possible combinations of valid multiple fault sets using a model of the turbine engine the conclusion range of the plurality of fault detectors. The valid multiple fault sets can include both static multiple fault sets that are determined from the turbine engine model and run-time multiple fault sets determined from the conclusions themselves. When the valid sets of multiple conclusions are identified, they can be combined using an aggregation rule. This allows the diagnostic aggregation mechanism to identify any combinations of multiple faults that are occurring in the turbine engine The diagnostic aggregation mechanism can also aggregate faults based on the dependency of the data used to generate the conclusions, e.g., the amount of overlap in the data used by the various techniques. This allows the diagnostic aggregation mechanism to give aggregated multiple conclusions based on independent evidence more weight than those where the conclusions are based on dependent evidence, as conclusions that are based on the same evidence are not independent and thus do not have the same probative value. Thus, by taking into account the degree of dependency in the data used to generate the conclusions, the conclusions can be aggregated in way that properly takes into account their relatively probative values.

In this embodiment, the conclusions based on device data with high dependency are aggregated using a high dependency aggregation rule, and the resulting high-dependency sets are then further aggregated using a weak dependency rule. Finally, any conclusions based on independent evidence can be aggregated using an independent combination rule. The resulting aggregation determines which fault(s) are most likely indicated by the plurality of conclusions, taken into account the dependency of the device data used to generate the conclusions. Thus, the embodiments of the invention provide a system for combining conclusions from multiple fault detection techniques to isolate likely faults in a turbine engine.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a system and method for combining conclusions from multiple fault detection techniques to isolate likely faults in a turbine engine. The embodiments of the invention provide the ability to effectively deal with multiple concurrent faults in the engine. Additionally, the embodiments of the invention provide the ability to correctly characterize multiple conclusions generated from evidence having different levels of interdependence.

Figure 1:
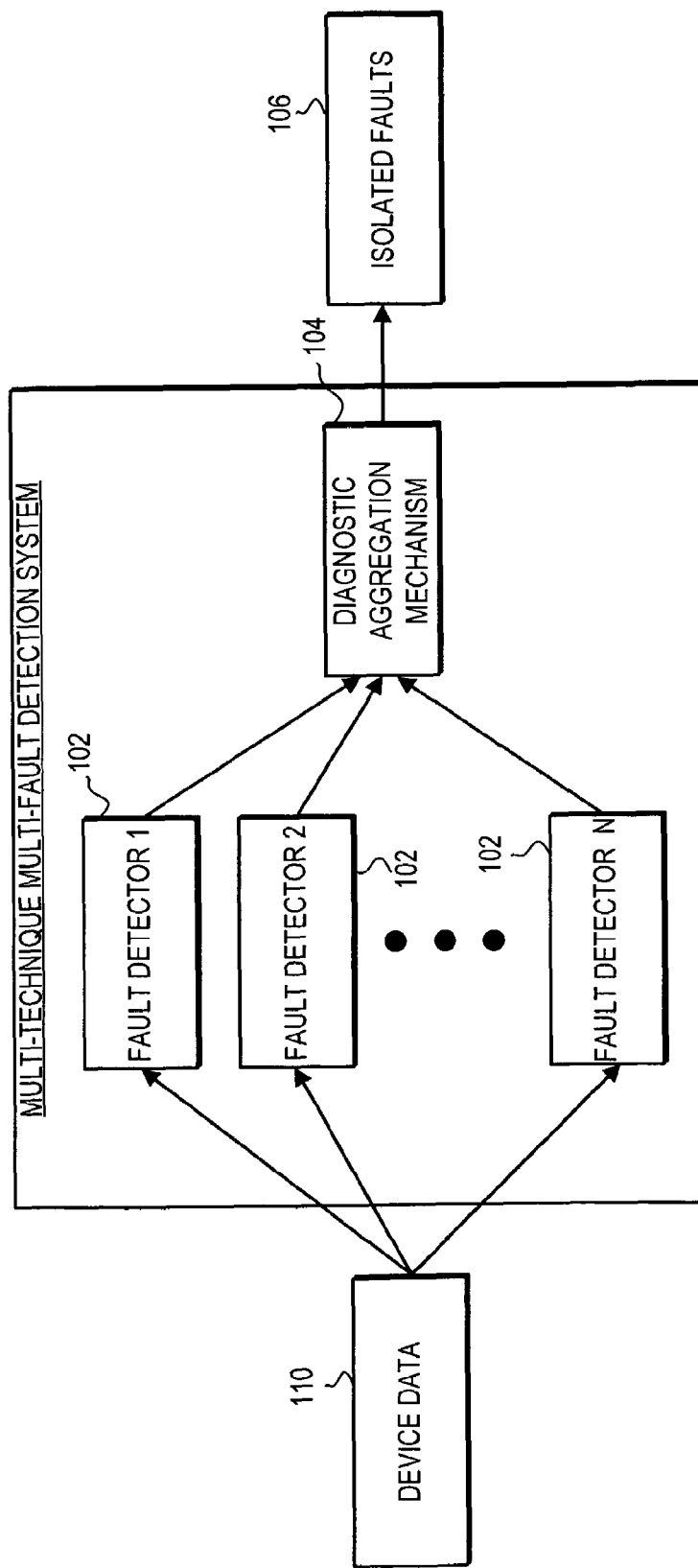
FIG. 1 is a schematic view of a multi-technique multi-fault detection system.

The various embodiments of the invention provide multi-technique, multi-fault detection system and method that isolates likely fault(s) in turbine engines. Turning now to FIG. 1, a schematic view of a multi-technique, multi-fault detection system 100 is illustrated. The system 100 receives device data 110, including sensor data from the turbine engine. The device data is passed to a plurality of fault detectors 102. Each fault detector 102 analyzes the device data to determine a likelihood of one or more particular faults in the turbine engine. The plurality of fault detectors 102 can use a different fault detection technique and different types and combinations of device data to determine the likelihood of fault in the turbine engine. Additionally, the plurality of fault detectors 102 can determine the likelihood of different types of faults in the turbine engine. Accordingly, each of the plurality of fault detectors 102 outputs a conclusion that indicates the likelihood of a corresponding fault or faults in the turbine engine.

The conclusions from the fault detectors are passed to a diagnostic aggregation mechanism 104. The diagnostic aggregation mechanism 104 evaluates the conclusions from the plurality of fault detectors 102, and generates isolated faults 106. The isolated faults 106 indicate the most likely fault or faults indicated by the plurality of conclusions.

In one embodiment, the diagnostic aggregation mechanism 104 isolates faults by evaluating the plurality of conclusions and determining possible multi-fault combinations that could be occurring. This is done by identifying possible combinations of valid multiple fault sets using a model of the turbine engine and the conclusion range of the plurality of fault detectors. The valid multiple fault sets can include both static multiple fault sets that are determined from the turbine engine model and run-time multiple fault sets determined from the conclusions themselves. When the valid sets of multiple conclusions are identified, they can be combined using an aggregation rule.

In isolating faults, the diagnostic aggregation mechanism 104 can also evaluate the plurality of conclusions based on the dependency of the data used to generate the conclusions, e.g., the amount of overlap in the data used by the various techniques. This allows the diagnostic aggregation mechanism 104 to give aggregated multiple conclusions based on independent evidence more weight than those where the conclusions are based on dependent evidence, as multiple conclusions that are based on the same or overlapping evidence are not independent and thus do not have the same probative value. Thus, by taking into account the degree of dependency in the data used to generate the conclusions, the diagnostic aggregation mechanism 104 can effectively aggregate conclusions and isolate faults.

In one embodiment, diagnostic aggregation mechanism 104 aggregates conclusions based on device data with high dependency using a high dependency aggregation rule, and the resulting high-dependency sets are then further aggregated using a weak dependency rule. Furthermore, the diagnostic aggregation mechanism 104 aggregates any conclusions based on independent evidence using an independent combination rule. The resulting aggregation determines which fault(s) are most likely indicated by the plurality of conclusions, taking into account the dependency of the device data used to generate the conclusions. Thus, the embodiments of the invention provide a fault detection system 100 for combining conclusions from multiple fault detection techniques to isolate likely faults in a turbine engine.

One suitable aggregation rule that can be used by the diagnostic aggregation mechanism 104 is a hybrid Dezert-Smarandache Theory (DSmT) aggregation rule. The hybrid DSmT rule allows the diagnostic aggregation mechanism 104 to identify any potential combinations of multiple faults that are occurring in the turbine engine. Additionally, the hybrid DSmT rule can be used to aggregate conclusions from fault detection techniques based on independent evidence. In general, hybrid DSmT is a variation of the Dempster-Shafer (D-S) statistical framework technique. The D-S statistical framework is a known technique typically used for diagnostic evidence aggregation. However, in traditional D-S analysis, evidence from multiple techniques is assumed to result from independent evidence and a single fault. Attempting to use traditional D-S techniques in multi-fault applications requires relaxing the single fault assumption, and significantly increases the computational complexity. Furthermore, traditional D-S analysis has limited ability to aggregate conclusions where the conclusions from the algorithms are not independent. For example, when multiple fault detection algorithms use the same sensor data. Thus, traditional D-S techniques cannot be effectively used in applications such as turbine engines where various different fault detection techniques use related evidence and multiple faults are possible.

DSmT based techniques provide the ability to relax the assumption that elements in the frame of discernment must be mutually exclusive. In general, DSmT formally combines sources of information represented in terms of belief functions, and is typically focused on uncertain, highly conflicting and imprecise sources of evidence. The foundation of DSmT is the definition of Dedekind's lattice, also called a hyper-power set of the frame of discernment, where the frame of discernment is set of all possible single faults The hyper power set of the frame of discernment breaks with the classic assumption that elements in a frame of discernment must be mutually exclusive, and thus can be used to relax the single fault assumption of traditional D-S techniques. As will be described in greater detail below, in one embodiment, a hybrid DSmT rule of combination is used to aggregate conclusions of valid sets determine any likely multi-fault combinations and thus isolate the faults occurring in the turbine engine. Additionally, the hybrid DSmT rule can be used to aggregate conclusions from fault detection techniques based on independent evidence.

Figure 2:
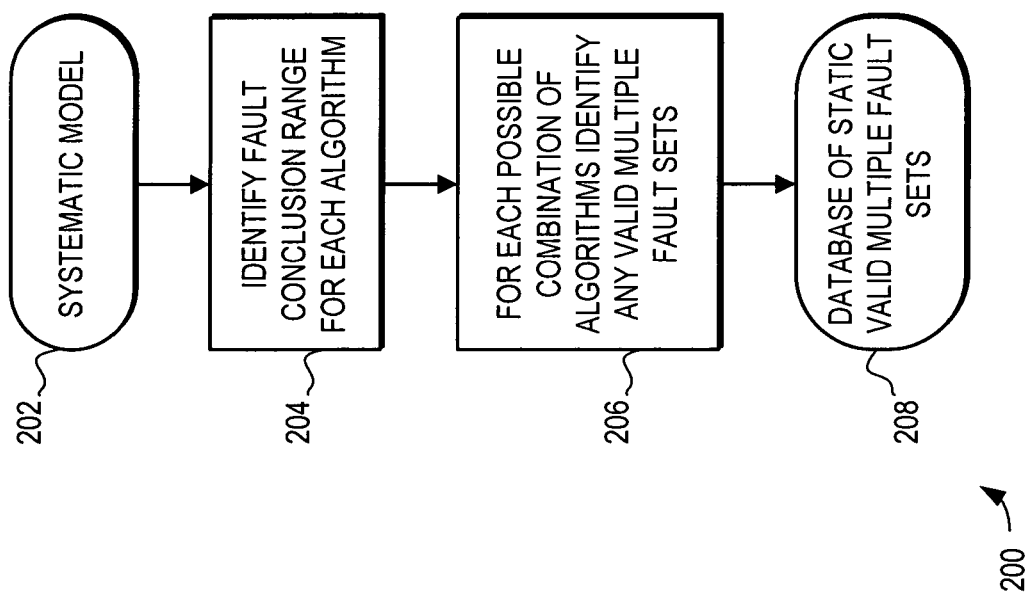
FIG. 2 is a flow diagram of a method for generating a database of static valid multiple fault sets.

Turning now to FIG. 2, a method 200 for determining multiple concurrent faults in a turbine engine is illustrated. In general, method 200 identifies valid multiple fault sets which are used to reduce the number of non-empty elements in the hyper power set to a more manageable size. Specifically, by identifying valid multiple fault sets, the number of non-empty elements in the hyper power set can be reduced to single faults and potentially valid multiple fault combinations, excluding all other multiple fault combinations. The valid multiple fault sets, as part of the reduced hyper power set, can then be used to aggregate conclusions from multiple fault detectors and isolate the most likely faults. Each valid multiple fault set identifies two or more faults that can accurately identified using the various fault detection techniques employed by the plurality of fault detectors. For example, each set can include a listing of faults that can occur simultaneously. Thus, the valid multiple fault sets each identify multiple faults that can occur and be detected simultaneously. During operation of the turbine engine, these valid multiple fault sets can then be used to determine when detected multiple faults indicate an actual multiple fault condition, and thus can be used to isolate the most likely faults that are occurring in the turbine engine. Specifically, by identifying valid multiple fault sets the non-empty elements of the hyper power set can be limited to single fault conclusions and valid multiple fault sets, allowing the conclusions from multiple fault detection techniques can be aggregated more efficiently, and a more precise detection of the most likely faults obtained.

In method 200, a systematic model 202 is used as the basis for determining the valid multiple fault sets. In general, a systematic model is a definition of the system under consideration, and is typically human understandable and machine interpretable. The systematic model 202 for a turbine engine would typically be generated from a functional description of the turbine engine and a failure mode effect and consequence analysis of the engine. This analysis determines the various different ways that components can fail what the effects of those failures would be on the larger system. This analysis serves as the static basis for the systematic model of the turbine engine. Additionally, the systematic model can include dynamic functions that identify how various diagnostic algorithms used by the fault detectors can provide information on the failure modes of the turbine engine. In this function each algorithm is correlated to the appropriate components in the turbine engine for which the algorithm provides diagnostic information. From this, a database of the various components in the turbine engine, how those components can fail, how the potential effects of those components can affect the larger system provides the static basis for the systematic engine.

A specific example of how a systematic model can be applied to a turbine engine will now be discussed. In the systematic model, each component $c_i$ in the turbine engine is associated with one or more functions $g_j$. For example, the metering valve component within the fuel control unit is associated with the function provide metered fuel. Next, each component $c_i$ in the turbine engine is associated with one or more failure modes $h_k$. These failure modes describe the mechanism of failure of the components. Additionally, attributes such as mean time to failure, repair cost, or repair time are correlated to various failure modes. Next, the systematic model includes how failure modes prevent the various components from achieving their functions. The systematic model captures this information in the form of a mapping, e.g., $\{\ldots, (g_j, h_k), \ldots\}$. This notation shows that failure mode $h_k$ affects function $g_j$, etc.

It should be noted that function $g_j$ associated with component $c_i$ may also depend on another function $g_s$. This function dependency can be captured by making $g_j$ depend on function $g_s$. As a general modeling rule, $g_s$, should not depend on any other function associated with component $c_i$. In other words, all functions associated with component $c_i$ are independent. Finally, diagnostic algorithms used by the various fault detectors are associated with functions. This information is combined into a systematic model that will be used to isolate faults in the turbine engine. The systematic model for a turbine engine can be developed using a variety of tools and techniques. For example, commercial off-the-shelf tools can be used to create the model from the information described above.

Returning to method 200, the first step 204 is to identify a fault conclusion range for each algorithm. In this step, the systematic model 202 is used to determine what the possible valid conclusions are from each fault detection algorithm used by the various fault detectors. For example, in a systematic model 202 where nodes represent failure modes $\{h_k\}$, functions $\{g_j\}$, and algorithms $\{a_i\}$, the arcs represent functional dependency, failure dependency, and algorithm location. By analyzing the systematic model, the frame of discernment for each fault detector algorithm is determined, as well as what parts of the frame of discernment are mutually exclusive. This information can then be used to generate valid sets of multiple faults.

For example, if an algorithm $a_l$, identifies a fault associated with function $g_j$, this implies two things: 1) one or more failure modes $g_j$ are present; or 2) the functions on which $g_j$ depend have failed. If $g_j$ depends on functions $g_a$, $g_b$, the same reasoning can be applied to $g_a$ and $g_b$, and those failure modes examined, up the backward chain of dependent functions. This backward chaining can be continued till all failure nodes are examined. Thus, the algorithm $a_l$ can be used to partition a failure mode set $\{h\}$ in to $\{h^A_l\}$ and $\{h\}/\{h^A_l\}$, where $\{h^A_l\}$ denotes the failure modes that can be implicated by algorithm $a_l$. The failure modes implicated by an algorithm are defined as the range $r(A_l)$ of the algorithm. When such an analysis is performed for every algorithm using the systematic model 202, a set of all possible multiple fault sets $\Theta$ can defined as follows:

$$\Theta = \left\{ h_0, \bigcup_l r(A_l) \right\} \quad (1.)$$

Where $h_0$ is an unknown failure mode.

With the range of each algorithm identified, the next step 206 is to identify any valid multiple fault sets for each possible combination of fault detection algorithms. This can be done by examining each algorithm to determine the valid sets of faults for each algorithm. Then, the conclusions of different algorithms are examined to determine combinations of conclusions outside the intersections of valid sets.

One technique that can be used to identify the valid multiple fault sets is an iterative examination of the conclusions of the various algorithms. In this technique, for each pair of fault detection algorithms, all two-element non-empty sets are determined by taking a union of the difference in each algorithm range. In each successive pass, the candidate k-element sets for a set of k algorithms are generated by joining (k−1) element sets of those algorithms, and deleting those that include any (k−1) subsets that were determined to be relatively empty at the previous iteration. This process is continued until no more non-empty sets can be generated. From this examination, a database 208 of static valid multiple fault sets is created.

As will be described in greater detail below with reference to FIG. 3, this database 208 of static multiple fault sets can then be used to aggregate conclusions from multiple diagnostic algorithms to determine multi-fault combinations and isolate likely faults.

Figure 3:
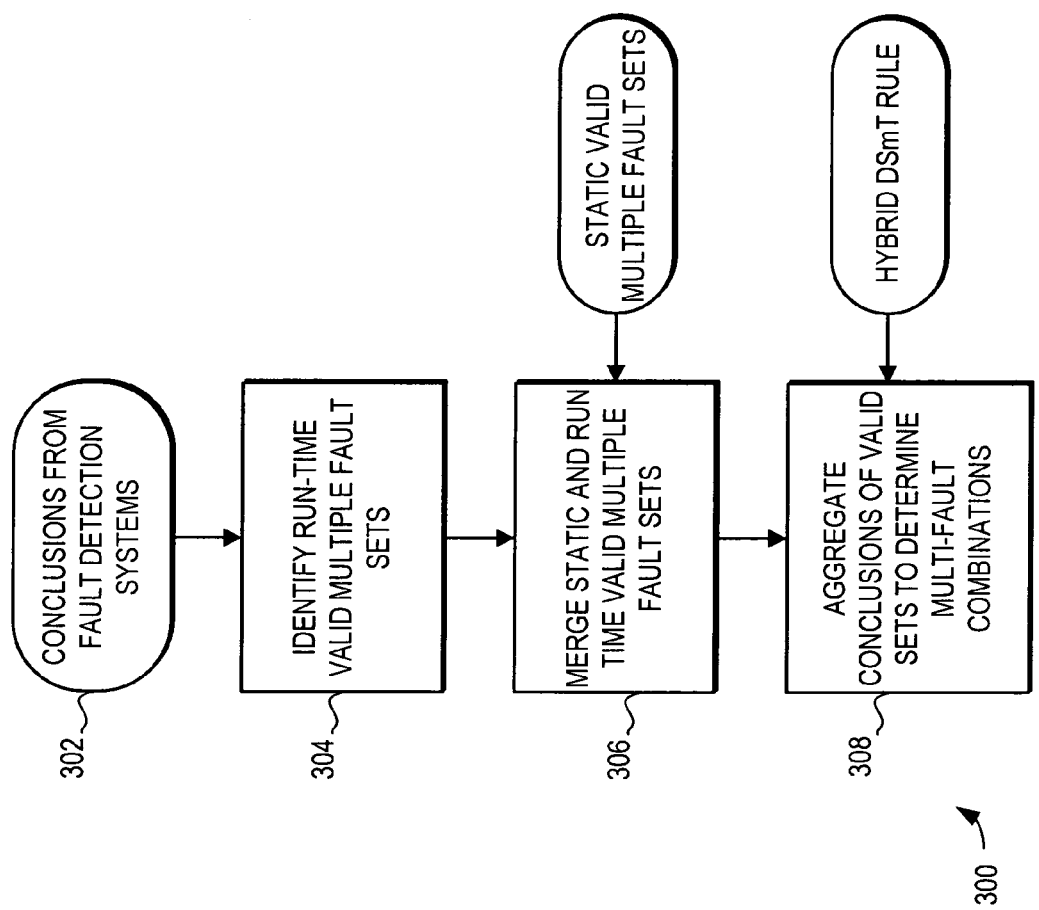
FIG. 3 is a flow diagram of a method for aggregating conclusions of valid sets.

Turning now to FIG. 3, a method 300 for aggregating conclusions from multiple fault detectors is illustrated. In general, this method uses sets of static multiple faults and a hybrid Dezert-Smarandache Theory (DSmT) rule to isolate likely faults from a plurality of conclusions generated by a plurality of fault detectors.

The first step 304 is to identify run-time valid multiple fault sets from a plurality of conclusions 302 received from the fault detection system. In one embodiment, the algorithms themselves are implemented to identify run-time valid multiple sets. Thus, when an algorithm concludes that there are multiple faults it identifies a run-time valid set.

With the run-time valid multiple fault sets identified, the next step 306 is to merge the static valid multiple fault sets generated in method 200 with the run-time valid multiple fault sets generated in step 304. The merged valid multiple fault sets are then used with the hybrid DSmT rule to isolate the most likely conclusions from the conclusions received from the fault detection system. This allows the diagnostic aggregation mechanism to identify the likely combinations of multiple faults that are occurring in the turbine engine.

The hybrid DSmT based techniques provide the ability to relax the assumption that elements in the frame of discernment must be mutually exclusive. In general, DSmT formally combines sources of information represented in terms of belief functions, and is typically focused on uncertain, highly conflicting and imprecise sources of evidence. Thus, in one specific embodiment, a hybrid DSmT rule of combination is used in step 308 to aggregate conclusions of valid sets determine any likely multi-fault combinations and thus isolate the faults occurring in the turbine engine. This rule preferably uses a hybrid model $M(\Theta)$ adapted for use either more than two independent sources of information. As one example, the rule of combination for the hybrid model $M(\Theta)$ can be defined as:

$$m_{M(\Theta)}(F) = \phi(F)[S_1(F) + S_2(F) + S_3(F)] \quad (2.)$$

Where $\Theta$ is the set of conclusions, $\phi(F)$ is the characteristic non-emptiness function of a set F, i.e., $\phi(F)=1$ if $F \neq \emptyset$ and $\phi(F)=0$ otherwise, where $\emptyset = \emptyset_M, \emptyset$. $\emptyset_M$ is the set of all elements of the Dedekind's lattice $D^\Theta$ that have been forced empty through the constraints of the model M and $\emptyset$ is the classical/universal empty set. $S_1(F)$ corresponds to the free DSmT rule of combination for k independent sources based on the free DSmT model, and is given by:

$$S_1(F) = \sum_{\substack{F_1, X_2, \ldots, F_k \in D^\Theta \\ (F_1 \wedge F_2 \wedge \ldots F_k = F)}} \prod_{i=1}^{k} m_i(F_i) \quad (3.)$$

And $S_2(F)$ represents the mass of all relatively and absolutely empty sets which are transferred to the total or relative ignorance and is given by:

$$S_2(F) = \sum_{\substack{F_1, X_2, \ldots, F_k \in D^\Theta \\ [U=F] \vee [(U \in 0)] \wedge (F_k = I_t)}} \prod_{i=1}^{k} m_i(F_i) \quad (4.)$$

And $S_3(F)$ represents the sum of relatively empty sets to the non-empty sets $$S_2(F) = \sum_{\substack{F_1, X_2, \ldots, F_k \in D^\Theta \\ (F_1 \vee F_2, \ldots, F_k) = F \\ (F_1 \wedge F_2, \ldots, F_k) \in 0}} \prod_{i=1}^{k} m_i(F_i) \quad (5.)$$

With $U \equiv u(F_1) \vee u(F_2) \vee \ldots \vee u(F_k)$ where $u(F)$ is the union of all singletons $h_i$ that compose F and $I_t \equiv h_1 \vee h_2 \vee \ldots \vee h_n$ is the total ignorance. It should be note that in turbine engine applications where the algorithms do not provide conclusions that satisfy non-existential constraints rule $S_2(F)$ is typically not applied.

In turbine engine fault detection applications, evidence aggregation can be viewed as a dynamic fusion problem where the hybrid model $M(\Theta)$ changes each time the fault detectors post results, i.e., some of the elements which were not empty at one posting may become empty the next and vice versa. In one embodiment, each time the results of the fault detector algorithms are entered, the hybrid DSmT rule, based on a new hybrid model $M(\Theta)$, is applied.

To determine which elements of the hybrid model $M(\Theta)$ are empty the model is examined at both the diagnostic algorithm level and the knowledge fusion level. Namely, if any one of the fault detection algorithms determines that a certain set of faults occurs simultaneously, the corresponding element in the hybrid model $M(\Theta)$ is determined to be relatively non-empty. This determination may not be sufficient in all cases, as some algorithms may have different levels of expertise and will therefore have different levels of discernment. This can prevent the accurate diagnosis of faults falling outside the frames of discernment. Therefore, when several algorithms each identify faults outside the intersection of their frame of discernment, knowledge fusion models can assume that those faults are occurring simultaneously and will assign appropriate beliefs based on the hybrid combination rule.

In addition to dealing with multiple fault conclusions, the embodiment of the invention can be applied to isolate faults from conclusions based on different levels of dependent evidence. For example, in cases where some fault detection conclusions are based on the same sensor data or even the same features in the sensor data. In this embodiment, the diagnostic aggregation mechanism aggregates conclusions based on device data with high dependency using a high dependency aggregation rule, and the resulting high-dependency sets are then further aggregated using a weak dependency rule. Furthermore, the diagnostic aggregation mechanism aggregates any conclusions based on independent evidence using an independent combination rule. The resulting aggregation determines which fault(s) are most likely indicated by the plurality of conclusions, taking into account the dependency of the device data used to generate the conclusions. This type of aggregation can be combined with isolation of fault from multiple conclusions, or performed independently.

In one specific implementation of this method, the fault detection algorithms are first partitioned into the non-overlapping, high dependence sets, where each set represents algorithms that base their conclusions on highly dependent evidence. For example, fault detection algorithms that use the same sensor features from the turbine engine are partitioned into the same set high dependence set. The resulting sets of conclusions can then further partitioned into non-overlapping, weak dependence sets, where each set represents conclusions based on weakly dependent evidence. For example, the conclusions of algorithms that use the same sensors, but not necessarily the same features in the sensor data are partitioned into the same weak dependence set.

In one embodiment, this partitioning of the algorithms is based on a determined proportion of the overlapping evidence, referred to herein as a degree of dependence $w_{dep}$. By determining the degree of dependence, the conclusions can be consistently categorized into the weak and high dependency sets, and combined using the appropriate rule. A variety of different techniques can be used to determine the degree of dependence. For example, it can be set apriori to an appropriate value, such as 0.5 for highly dependent evidence and 0.25 for weekly dependent evidence.

Alternatively, the degree of dependence $w_{dep}$ can be dynamically calculated based on some scheme. One method of calculating the degree of dependence can be based on the degrees of freedom of the algorithms in each dependence set. For example, if the algorithms use different methods but the same sensor features, then the amount of independent evidence can be $w_{dep}=\frac{1}{3}$ of the entire body of evidence, because there are three degrees of freedom (method, sensor and feature) and the algorithms differ only in the method used. In such a case, the amount of dependent evidence used by each high dependence algorithm would be $w_{dep}=\frac{2}{3}$.

Finally, the conclusions from each weak dependence set are aggregated using an independent combination rule, such as a DSmT combination rule based on independent sources of evidence.

As one illustrative example, consider four algorithms $A_1$, $A_2$, $A_3$ and $A_4$. These algorithms apply a variety of methods to one or more sensor features. Algorithm $A_1$ applies method $m_1$ to feature $f_1$ of sensor $s_1$. Algorithm $A_2$ applies method $m_2$ to feature $f_1$ of sensor $s_1$. Algorithm $A_3$ applies method $m_1$ to feature $f_2$ of sensor $s_2$. Finally, algorithm $A_4$ applies method $m_3$ to feature $f_3$ of sensor $s_2$. The algorithms are partitioned into three high dependency sets, HDSet$_1$={$A_1$, $A_2$}, HDSet$_2$={$A_3$} and HDSet$_3$={$A_4$}. The conclusions of each such set are then further partitioned into the following two weak dependence sets: WDSet$_1$={HDSet$_1$} and WDSet$_2$={HDSet$_2$, HDSet$_3$}. With the conclusions so partitioned, the conclusions can be aggregated using suitable aggregation rules.

Figure 4:
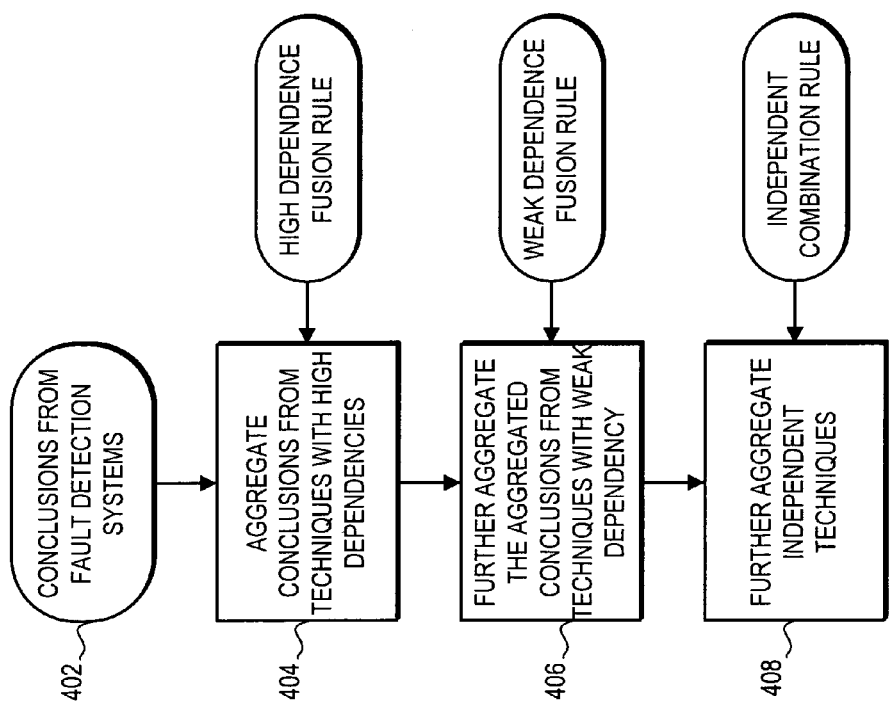
FIG. 4 is a flow diagram of a method for aggregating conclusions based on evidence dependency.

Turning now to FIG. 4, a method 400 for aggregating conclusions from multiple fault detectors using dependent evidence is illustrated. In this method, the first step 404 is to aggregate the plurality of conclusions 402 from techniques with high dependency. This step uses a high dependence fusion rule, on the high dependence sets of fault detector conclusions. One example of a high dependence fusion rule can be defined as:

$$m_{rec,ident}(F) = 1/k \sum_{\forall A \neq \Theta} m_{A,ident}(F) \forall F \neq \Theta \quad (6.)$$

$$m_{rec,ident}(\Theta) = 1 - \sum_{\forall F \neq \Theta} m_{rec,dep}(F) \quad (7.)$$

Where $m_{rec,ident}$ reconciled belief from multiple algorithms using the identical features and sensors, and where k is the number of algorithms in the high dependency set. In one embodiment, the high dependence rule operates by taking an average of all algorithms in the highly dependent set. For example, if five fault detection algorithms provide 0.1, 0.2, 0.3, 0.4, 0.5 belief to a fault hypothesis of "Broken blade" then $m_{A1}=0.1$, $m_{A2}=0.2$, and so on. When the algorithms all use the same feature of the same sensor, the different algorithms do not provide any additional support. Thus, the results can be properly aggregated by averaging the belief of the five algorithms. The result of step 404 is thus a single, aggregated conclusion for each set of high dependency algorithms.

With the conclusions for techniques with high dependencies aggregated, the next step 406 is to further aggregate the aggregated conclusions from techniques with weak dependency. Included in the conclusions that are aggregated with this step are the previously aggregated conclusions for sets of high dependency algorithms. Thus, step 406 aggregates any single conclusions with weak dependency with any aggregated conclusions from the previous step to generate a single aggregated conclusion that defines the ultimate conclusion from all techniques based on high dependent evidence and weak dependent evidence. Weak dependency refers to conclusions that may use different evidences. For example, algorithms that use related data from different sensors, such as the same type of sensor but from different manufactures. To aggregate this data, a weak dependence fusion rule is used. For example, the weak dependence rule can comprise taking an average that is weighted to account for weak dependency. As one example of a weak dependency rule, each algorithm $A_i$ has a range $r(A_i)$. Each set of faults $\{\wedge F_{j,A_i}\}$ includes the conclusions that could be occurring simultaneously. To determine the weighted average of these conclusions, the weighted average of the conclusions $\overline{m}(F)$ can be defined as:

$$\overline{m}(F) = 1/k \sum_{\forall A_i} m_{A_i,ident}(F) \forall F \in D^{\Theta} \quad (8.)$$

Where the quantity $\overline{m}$ is an average belief assigned by F by all algorithms, and where any hypothesis $\wedge F_{j,A_i}$ can be assigned a belief as:

$$M_{ident,rec}(\wedge F_{j,A_i}) = \phi(\wedge F_{j,A_i}) \left[ 1/k \sum_{i=1}^{k} \prod \overline{m}(F_{j,A_i}) \right] \quad (9.)$$

And modified as:

$$M_{ident,rec}(F) = \overline{m}(f)\left(\sum_{\exists F_{j,A_i}=F} \frac{1}{k} m_{ident,rec}(\wedge_{j=1}^{n} F_{j,A_i})\right) \quad (10.)$$

In equation 10, the conflict between two algorithms that use highly dependent evidence (i.e., identical sensors and features) is 'distributed' to multiply their respective beliefs to all possible combinations of F. For example, if algorithm $A_1$ and algorithm $A_2$ use identical sensors and features, but algorithm $A_1$ claims fault $F_1$ with a $m(A_1)$ degree of belief, algorithm $A_2$ claims fault $F_2$ with a $m(A_2)$ degree of belief, then there is a conflict. Equation 10 resolves this conflict by assigning $m(A_1)$ and $m(A_2)$ to the combined fault $F_1$ and $F_2$, or $m(A_1\hat{}A_2)$.

The result of step 406 is thus an aggregation of conclusions based on dependent evidence for each set of weak dependency algorithms. Thus, steps 404 and 406 have aggregated conclusions from techniques with high and weak dependency into a single conclusion representing the ultimate conclusion of conclusions based on any type of dependent evidence. With the sets of conclusions for techniques with weak dependencies aggregated, the next step 408 is to further aggregate the conclusions based on an independent techniques. This step uses an independent combination rule. For example, the independent combination rule can use a DSmT combination rule, such as the rule used in method 300 to aggregate conclusions of valid sets to determine multi-fault combinations. In this step the DSmT combination rule is used to aggregate the conclusions of the independent fault detection techniques based on the dependency of the evidence to isolate the most likely faults in the turbine engine. It should be noted that this step can utilize an independent combination rule such as DSmT because the remaining conclusions are based on independent evidence. Specifically, because conclusions based on dependent evidence were separated from conclusions based on independent evidence, and the conflict between conclusions based on dependent evidence were resolved in steps 404 and 406 above, the remaining conflict between conclusions can be resolved using an independent combination rule. Thus, step 408 uses an independent combination rule to resolve conflicts between the remaining conclusions based on independent evidence and the aggregated conclusions from step 406.

The resulting aggregation of step 408 thus determines which fault(s) are most likely indicated by the plurality of conclusions, taking into account the dependency of the device data used to generate the conclusions.

A detailed example of how the techniques described above can be applied to a turbine engine in an auxiliary power unit (APU) will now be discussed. In a typical turbine engine, ambient air entering the engine is split at the plenum. Part of the air enters the main compressor, and the remaining air enters the load compressor. The flow of air through the load compressor is regulated by the inlet guide vanes. High pressure air from the main compressor enters the combustor, in which fuel is introduced using a series of nozzles. The air-fuel mixture is burnt continuously and smoothly in the combustor. Hot combustion gases are expanded in the turbine engine, which drives the engine shaft. Part of this useful work is expended by the main compressor, and the remaining part is expended by the load compressor to provide bleed air and power the gearbox. The gear box provides power to a generator, which provides electrical power to the vehicle. Exhaust air from the turbine engine is introduced combustor using a fuel control unit. The engine consists of a single hollow shaft supported by a set of oil-cooled bearings. Lubrication oil is provided using a gear pump and air-cooled heat exchanger. Fast acting valves provide the necessary surge control and protection. The turbine engine is started using a battery operated started motor.

A variety of different fault detection techniques can be used on such a turbine engine. These fault detection techniques can use a variety of different algorithms, from simple threshold checking calculations to complex multivariate model based estimations.

Figure 5:
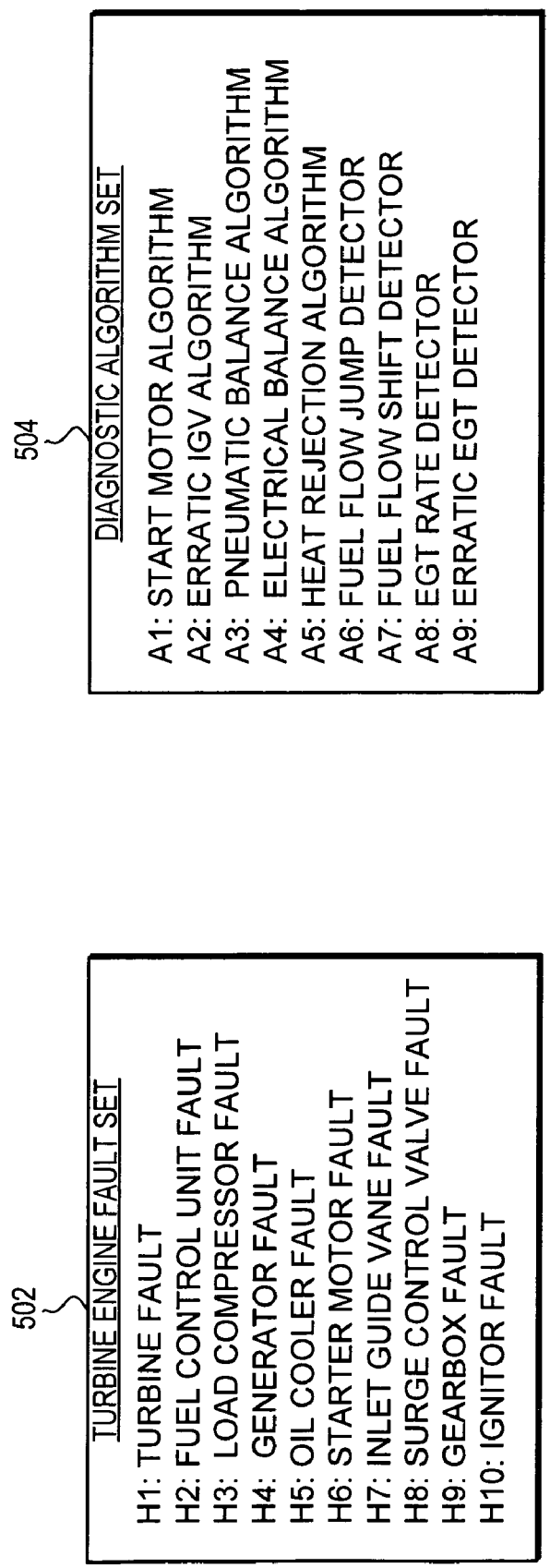
FIG. 5 is a table view of a schematic view of an exemplary turbine engine fault set and an exemplary diagnostic algorithm set.

Turning now to FIG. 5, a listing 502 of an exemplary set of potential turbine engine faults and a listing 504 of an exemplary set of diagnostic algorithms are illustrated. This listing 502 includes various types of faults that can be predicted for a turbine engine. Using systematic modeling, a database of static valid multiple fault sets can be determined. As the set of conclusions $\Theta$ can be defined as:

$$\bigcup_{i=1}^{9} r(A_i) = \{H_{1-8}\} \quad (11.)$$

$$H_0 = \text{group } (H_9, H_{10}) \quad (12.)$$

$$\Theta = \{H_0, H_{1-8}\} \quad (13.)$$

In this example, algorithm $A_1$ analyzes the starter motor current during the startup phase and provides evidence of faults in the starter motor. During startup, the turbine gear is not yet engaged, and hence the range of $A_1$ is very small. That is, $r(A_1)=H_1$. On the other hand, algorithm $A_2$ monitors the feedback signal from the inlet guide vane position sensor and is influenced by mechanical problems in the vane mechanism such that $r(A_2)=H_7$. This measurement is made when the APU is delivering a full load. Given range of these algorithms, it is clear that $m_{A1}$, and $m_{A2}$ should not be treated as conflicting evidence, but instead should be treated as capable of providing evidence supporting a multiple fault hypothesis.

In this example, the calculation of valid multiple fault sets can be illustrated by algorithms $A_3$, $A_4$, and $A_5$. Algorithm $A_3$ calculates pneumatic balance for the APU. Torque generated by the turbine is roughly equal to the fuel burnt in the combustor and the torque expended by the load compressor. This balance is performed when the APU is idling, i.e., under no load conditions. Algorithm $A_4$ performs the load balance under exclusive electrical load, i.e., the APU providing electrical power. Under these conditions, the guide vanes are fully closed and the algorithm thus cannot implicate the IGV or the load compressor. Algorithm $A_5$ calculates the residual in the heat rejection system. Heat generated at the bearing and generator is removed by the oil cooler.

Using a systematic model, the range of the exemplary algorithms in the exemplary turbine engine is found to be:

$$r(A_3)=\{H_1,H_3,H_3\}$$

$$r(A_4)=\{H_1,H_3,H_4\}$$

$$r(A_5)=\{H_1,H_3,H_4,H_5\} \quad (14.)$$

Algorithms $A_6$, $A_7$, $A_8$, $A_9$ provide evidence toward turbine and fuel control faults. However, each of these algorithms use different methods and work on different sensors.

Algorithm $A_6$ is the fuel flow jump detector and it applies a fuzzy logic method to the magnitude feature of the fuel flow sensor. Algorithm $A_7$ monitors for changes in the magnitude feature of the fuel flow sensor, but uses a sequential probability ratio testing method. Algorithm $A_8$ is an EGT rate detector, and uses a slope feature of the exhaust gas temperature sensor, with the slope being analyzed using a fuzzy logic method. Finally, algorithm $A_9$ applies a hypothesis testing method to the variance feature of the exhaust gas temperature sensor. Given the overlap between these algorithms with respect to common sensors, it is needed to explicitly calculate the dependence between evidences $m_{A6}$, $m_{A7}$, $m_{A8}$, $m_{A9}$.

With the dependency of the various algorithms calculated, the conclusions can be partitioned into high dependency and weak dependency sets, as described above. Then, with the algorithms partitioned according the dependence of evidence, the conclusions from those algorithms can be aggregated using aggregation method 400 described.

Figure 6:
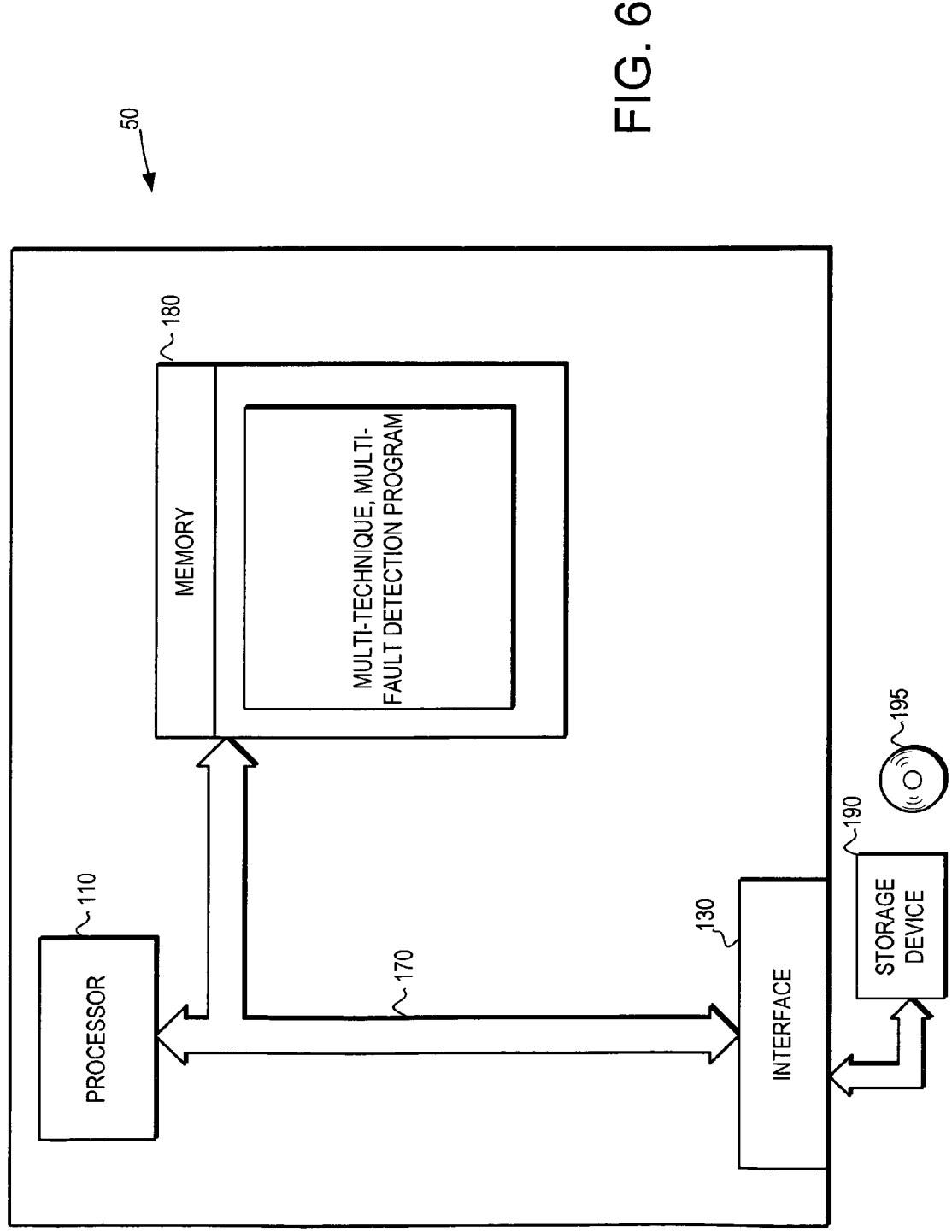
FIG. 6 is a schematic view of a computer system in accordance with an embodiment of the invention.

The multi-technique, multi fault detection system and method can be implemented in wide variety of platforms. Turning now to FIG. 6, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a multi-technique, multi fault detection program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 6, storage device 190 can comprise a disc drive device that uses discs 195 to store data.

In accordance with the preferred embodiments of the invention, the computer system 50 includes a deterioration prediction program. Specifically during operation, the deterioration prediction program is stored in memory 180 and executed by processor 110. When being executed by the processor 110, fault detection program receives data from the device being monitored and isolates fault detection predictions from that data.

As one example implementation, the fault detection prediction system can operate on data that is acquired from the mechanical system (e.g., aircraft) and periodically uploaded to an internet website. The analysis is performed by the web site and the results are returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 195), and transmission media such as digital and analog communication links.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A fault detection system for detecting faults in a turbine engine, the system comprising:
    a plurality of fault detectors the plurality of fault detectors adapted to receive device data from the turbine engine and determine a plurality of fault conclusions from the device data; and
    a diagnostic aggregation mechanism, the diagnostic aggregation mechanism adapted to receive the plurality of fault conclusions and utilize at least one valid multiple fault set to aggregate the plurality of fault conclusions and isolate a likely fault in the turbine engine, wherein the diagnostic aggregation mechanism is adapted to aggregate the plurality of fault conclusions and isolate a likely fault in the turbine engine using a hybrid Dezert-Smarandache Theory (DSmT) aggregation rule.

2. The system of claim 1 wherein the at least one valid multiple fault set is determined from a systematic model of the turbine engine, the systematic model describing effects of a plurality of failure modes on the turbine engine.

3. A fault detection system for detecting faults in a turbine engine, the system comprising:
- a plurality of fault detectors, the plurality of fault detectors adapted to receive device data from the turbine engine and determine a plurality of fault conclusions from the device data; and
- a diagnostic aggregation mechanism, the diagnostic aggregation mechanism adapted to receive the plurality of fault conclusions, partition the plurality of fault conclusions based on dependency of data used by the plurality of fault detectors to generate the plurality of fault conclusions into high dependent sets, and further partition high dependent sets into weak dependent supersets, and to isolate a likely fault in the turbine engine by aggregating conclusions in the high dependent sets and by aggregating conclusions in the weak dependent supersets.

4. The system of claim 3 wherein the diagnostic aggregation mechanism is adapted to aggregate conclusions in the high dependent sets using a high dependence fusion rule, and wherein the high dependence fusion rule comprises averaging conclusions based on high dependent device data.

5. The system of claim 4 wherein the diagnostic aggregation mechanism is adapted to aggregate conclusions in the weak dependent supersets using a weak dependence fusion rule, and wherein the weak dependence fusion rule comprises averaging conclusions using a weighted average.

6. The system of claim 5 wherein the diagnostic aggregation mechanism is further adapted to aggregate conclusions based on independent evidence and the aggregated conclusions in the weak dependent supersets using an independent evidence rule.

7. The system of claim 6 wherein the independent evidence rule comprises a hybrid Dezert-Smarandache Theory (DSmT) aggregation rule.

8. A method of detecting faults in a turbine engine, the method comprising the steps of:
- receiving device data from the turbine engine;
- determining a plurality of fault conclusions using a plurality of fault detection techniques, the plurality of fault detection techniques each using a subset of the device data; and
- isolating likely faults by utilizing at least one valid multiple fault set to aggregate the plurality of fault conclusions and isolate a likely fault in the turbine engine, wherein the step of isolating likely faults by utilizing at least one valid multiple fault set to aggregate the plurality of fault conclusions and isolate a likely fault in the turbine engine comprising using a hybrid Dezert-Smarandache Theory (DSmT) aggregation rule.

9. The method of claim 8 wherein the step of isolating likely faults by utilizing at least one valid multiple fault set to aggregate the plurality of fault conclusions and isolate a likely fault in the turbine engine comprises determining the at least one valid multiple fault set using a systematic model of the turbine engine, the systematic model describing effects of a plurality of failure modes on the turbine engine.

10. A method of detecting faults in a turbine engine, the method comprising the steps of:
- receiving device data from the turbine engine;
- determining a plurality of fault conclusions using a plurality of fault detection techniques. the plurality of fault detection techniques each using a subset of the device data;
- partitioning the plurality of fault conclusions based on dependency of data used by the plurality of fault detection techniques to generate the plurality of fault conclusions into high dependent sets, and further partitioning high dependent sets into weak dependent supersets; and
- isolating likely faults in the turbine engine by aggregating conclusions in the high dependent sets and by aggregating conclusions in the weak dependent supersets.

11. The method of claim 10 wherein the aggregating conclusions in the high dependent sets comprises aggregating using a high dependence fusion rule, and wherein the high dependence fusion rule comprises averaging conclusions based on high dependent device data.

12. The method of claim 11 wherein the aggregating conclusions in the weak dependent supersets comprises aggregating using a weak dependence fusion rule, and wherein the weak dependence fusion rule comprises averaging conclusions using a weighted average.

13. The method of claim 12 wherein the step of isolating likely faults further comprises the step of aggregating conclusions based on independent evidence and the aggregated conclusions in the weak dependent supersets using an independent evidence rule.

14. The method of claim 13 wherein the independent evidence rule comprises a hybrid Dezert-Smarandache Theory (DSmT) aggregation rule.

15. A program product comprising:
- a fault detection program, stored on a computer-readable recordable medium which, when run, causes a processor to predict a fault in a turbine engine, the fault detection program including:
- a plurality of fault detectors, the plurality of fault detectors adapted to receive device data from the turbine engine and determine a plurality of fault conclusions from the device data;
- and a diagnostic aggregation mechanism, the diagnostic aggregation mechanism adapted to receive the plurality of fault conclusions and utilize at least one valid multiple fault set to aggregate the plurality of fault conclusions and isolate a likely fault in the turbine engine, wherein the diagnostic aggregation mechanism is adapted to aggregate the plurality of fault conclusions and isolate a likely fault in the turbine engine using a hybrid Dezert-Smarandache Theory (DSmT) aggregation rule.

* * * * *